Figures 1, 2:
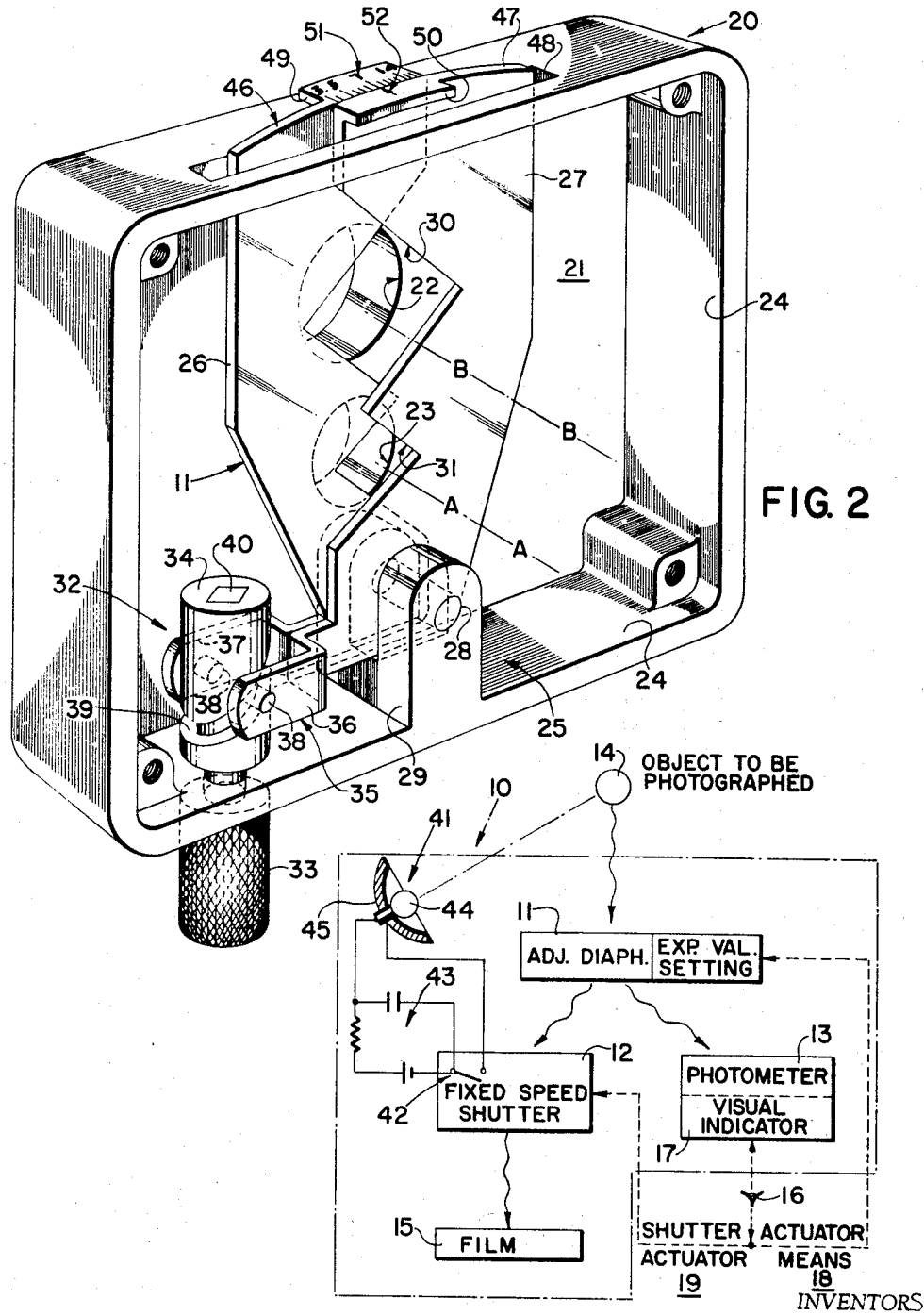

Dec. 31, 1968     E. H. LAND ET AL     3,418,903

ADJUSTABLE DIAPHRAGM WITH INDICIA THEREON

Filed Oct. 29, 1964

INVENTORS
Edwin H. Land
and
Herbert A. Bing
BY Brown and Mikulka
and
Donald M. Sandler
ATTORNEYS United States Patent Office
3,418,903
Patented Dec. 31, 1968

3,418,903
ADJUSTABLE DIAPHRAGM WITH INDICIA THEREON
Edwin H. Land, Cambridge, and Herbert A. Bing, Wellesley, Mass., assignors to Polaroid Corporation, Cambridge, Mass., a corporation of Delaware
Filed Oct. 29, 1964, Ser. No. 407,388
3 Claims. (Cl. 95—10)

This invention relates to cameras in which the exposure value setting of the shutter mechanism for steady state light is established by the use of a built-in photometer, and more particularly to a camera of this type provided with a flash attachment and flash synchronizing contacts for permitting the user to photograph a subject under flash illumination when the steady state light level is too low to achieve proper exposure.

A camera of the type described is disclosed in co-pending application Ser. No. 359,114, filed Apr. 13, 1964, now Patent No. 3,315,579, and owned by the assignee of this application. Such camera employs a fixed speed shutter mechanism, with the exposure value of the mechanism being determined by an adjustable diaphragm in the form of a pair of relatively movable elements contoured to define an exposure aperture whose area depends upon the relative position of the elements. The latter are also contoured to define a photometer aperture which synchronously changes by the same proportion that the exposure aperture changes upon relative movement of the elements. With this arrangement, the diaphragm can be adjusted until the area of the exposure aperture is correct for the level of scene brightness. While the adjustment could, of course, be automatic like that shown in Patent No. 3,116,673 granted to R. Bogopolsky, it could also be manual. In the latter case, the user would manually adjust the diaphragm to change the area of the photometer aperture until the intensity of light from the scene entering the photometer reaches a standard level as visually indicated by an extinction photometer or a photosensitive device coupled to a null meter. At such time, the user would be assured that the exposure aperture is correct for the level of scene brightness. However, the above procedure is applicable only to a scene under steady state lighting conditions and at a level exceeding some minimum value of scene brightness at which the photometer is operative. When the scene brightness is less than such minimum value, proper exposure can be achieved using a flash bulb whose output is properly synchronized with movement of the shutter mechanism. To this end, the camera is provided with a flash attachment and flash synchronizing contacts.

With flash illumination of a subject, the area of the exposure aperture to achieve proper exposure, and hence the relative position of the diaphragm elements, is a function of the distance of the subject to the camera. Therefore, subjects illuminated by flash can be exposed properly if means are provided for manually adjusting the diaphragm elements, and if the relative position of the elements is calibrated in terms of distance from the subject to the camera. The calibration is directly accomplished by using a pair of index means, one of the pair being on the camera housing and the other on one of the diaphragm elements, calibrated in distance units. The problem with this approach lies in the fact that the mechanical coupling between the elements must be precise since any backlash present will cause the actual area of the exposure aperture for a given distance setting of the index means to be slightly different from the area required by the given setting. It is the solution of this problem that is the primary object of the present invention.

Briefly, the invention involves placing one of the pair of index means on each of the diaphragm elements such that the area of the exposure aperture is made dependent only upon the relative positions of the two elements and not upon the mechanical coupling between the elements and the actuator means, by which the relative position of the element is manually changed. In other words, the presence of "lost-motion" between the actuator means and the elements cannot affect accurately setting the latter to a relative position at which the exposure aperture defined thereby is correct for the distance of the subject to the camera. In addition, this approach to index location results in effectively doubling the scale length in comparison to that associated with the conventional index location and permitting a vernier scale arrangement to be used to accurately fix the exposure aperture area for distances intermediate the main scale markings.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

In the drawing.
FIGURE 1 is a block diagram of a camera into which the present invention is incorporated; and
FIG. 2 is a perspective rear view of the front-end of the camera showing the adjustable diaphragm elements, and the actuator means coupled to the elements for manual adjustment of the latter.

Referring now to FIGURE 1, reference numeral 10 designates a camera system into which the present invention is incorporated. System 10 includes exposure-value control means 11 having a manually variable exposure aperture aligned with fixed speed shutter 12 and a photometer aperture aligned with comparison photometer 13 such that light from the scene 14 being photographed on film 15 is applied to both the shutter and the photometer. The latter can be of the extinction type shown and described in the copending application referred to above wherein observer 16 views the light from the scene and from a standard lamp in a common field designated at 17. In the absence of photometric balance, observer 16 would operate actuator means 18 simultaneously changing the photometer aperture and the exposure aperture until field 17 indicated to the observer that photometric balance had been achieved. When this has been accomplished, the intensity of light reaching the photometer will have been reduced to a standard value that is independent of the brightness of scene 14, and the exposure aperture will have been adjusted to a size such that with fixed speed shutter 12, the exposure value of the shutter mechanism will be correct for the scene brightness.

On the other hand, if a photosensitive element were incorporated into the camera, and used to drive a null meter, for example, reference numeral 17 would designate the meter scale visible to observer 16. The observer, in this case, would operate actuator means 18 until the light passing through the photometer aperture associated with the diaphragm means 11 and falling on the photosensitive element were attenuated to a degree that caused the meter to be driven to its null position indicating a balanced condition. In either case, however, observer 16, having satisfied himself that photometric balance has been achived, would then operate shutter actuator 19 for the purpose of tripping shutter 12 and effecting exposure of film 15.

When the brightness of scene 14 decreases below a level at which the brightness of the light incident on photometer 13 is less than the standard value described above, it will not be possible to obtain a photometric balance at visual indicator 17. Observer 16, would then have to resort to flash illumination of the scene in order to obtain proper exposure, and the photomeeter would not be used. For flash illumination purposes, it is necessary to functionally relate the area of the exposure aperture of diaphragm means 11 to the distance of the subject from the flash bulb. The functional relationship is established by such factors as film speed, type of flash bulb, etc. For a fixed film speed, a fixed type of bulb, etc., the area of the exposure aperture necessary to obtain proper flash exposure, and hence the relative position between the diaphragm elements, is functionally related to the distance of the subject to the camera. The concept on which this invention is based involves placing one of a pair of index marks calibrated directly in distance on one of the diaphragm elements and the other of the pair of marks on the other of the elements. In this manner, the user prepares to take a flash exposure merely by manually adjusting the elements until the index marks indicate the distance of the subject to the camera. Because the both index marks are on the diaphragm elements, any lost motion in the mechanism by which the relative position of the elements is changed cannot effect the size of the exposure aperture. This invention can be embodied into a camera in the manner shown in FIG. 2 to which reference is now made.

Reference numeral 20 designates the front face housing of camera 10 and contains in front wall 21, spaced photometer and exposure openings 22 and 23 respectively. Opening 23 contains the usual objective lens assembly (not shown) and defines exposure axis A—A; and opening 22 defines photometer axis B—B. Axially extending peripheral walls 24 bound front wall 21 defining a rearwardly opening recess 25 which contains adjustable diaphragm means 11. The latter comprises a pair of blades or elements 26 and 27 pivotally mounted to the housing upon common pivot axis 28 constituted by a pin supported at its axial ends by bosses 29 integral with the housing. Each of blades 26 and 27 are contoured along an edge thereof containing pivot pin 28 to define photometer aperture 30 and exposure aperture 31. As shown in FIG. 2, exposure aperture 31 intersects and lies normal to axis A—A between the objective lens (not shown) in exposure opening 23 and the fixed speed shutter (not shown in FIG. 2); and photometer aperture 30 lies along the axis B—B spaced from the axis A—A, with axes A—A and B—B, the axis of pin 28 lying in a common plane. Upon pivotal movement of the two elements 26, 27 about pin 28, apertures 30, 31 are caused to change in area synchronously and in the same proportion. For example, if the exposure aperture is changed by one stop (i.e., if the area is halved or doubled), then the photometer aperture is changed by one stop.

In order to provide for controlled pivotal movement of the elements, actuator means 32 is utilized and takes the form of knob 33, cam means 34 and cam follower means 35. The cam follower means comprises a pair of extensions 36, 37 projecting respectively from elements 26, 27 adjacent the region of the latter defining the axis of pin 28, and terminating in free ends that are spaced and provided with opposite cam followers 38 that are cylindrical in shape with axes parallel to the axis of pin 28. The free ends of extensions 36, 37 lie adjacent to diametrically opposite surfaces of cam means 34 which is cylindrical with an axis that is normal to and spaced from the axis of pin 28. Cam followers 38 are operatively engaged in helical groove 39 contained in cam means 34 which is rigidly mounted on one end of square shaft 40 for rotation in recess 25 relative to the housing. Shaft 40 extends through a suitable hole in the lower wall 24 as seen in FIG. 2 and the other end of shaft 40 is rigidly attached to knurled knob 33. The user can thus manually grasp the knob and exert sufficient torque thereon to rotate the cam means causing the elements 26, 27 to operate with a "scissors" movement. Thus, rotation of knob 33 imparts simultaneous but oppositely directed pivotal movement to elements 26, 27; and photometer aperture 30 and exposure aperture 31 are increased or decreased simultaneously by the same relative amount with the ratio of the areas of the two apertures remaining constant and independent of the angular position of the elements.

From the above, those skilled in the art will appreciate that diaphragm elements 26, 27 constitute exposure value control means manually adjustable to control the exposure value of the shutter because the exposure value of the shutter mechanism is determined by the shutter speed (which is fixed) and the exposure aperture area (which is manually adjustable). Moreover, it can be seen that actuator means 32 is coupled to the exposure value control means and is manually operable to adjust the latter. As previously indicated, the availability of sufficient steady state scene light to permit the user to operate the actuator means until the photometer aperture is adjusted to a value which attenuates light from the scene to a standard value, will enable the user to correctly adjust the exposure aperture for the scene lighting conditions. Ambient lighting below which the photometer aperture cannot provide photometer 13 with the standard value of light requires the use of flash illumination, and to this end, the camera may be provided with flash apparatus 41 schematically shown in FIGURE 1 as including flash synchronization contacts 42, power supply 43 and flash bulb 44 inserted in reflector 45.

For a subject illuminated by flash, the size of the exposure aperture is determined by the distance of the subject to the camera. Therefore, one approach is to mark the angular positions of knob 33 relative to wall 24 adjacent thereto in terms of subject distance. In this manner, the user having decided to use flash to illuminate the subject would measure its distance to the camera and merely set that distance into the camera by turning the knob until suitable index marks on the knob and camera housing were aligned. The problem with this approach is that the precision with which groove 39 in cam means 34 is formed and the fit between cam followers 38 and groove 39 determines the precision with which correlation can be achieved between the exposure aperture and the subject distance as indicated by the knob. The degree of correlation necessary, depends upon many factors beyond the scope of this application, but situations exist in which mass produced molded components associated with the actuator means fail to provide the necessary degree of correlation. As indicated above, the novel approach disclosed herein involves applying indicia to the elements themselves. This can be accomplished by fabricating elements 26 and 27 such that free end portions 46 and 47 respectively extend through slot 48 in top wall 24 (as seen in FIG. 2) and are visible to the user. Free end portions 46 and 47 are provided with flanges 49 and 50 respectively, and index marks 51 and 52, calibrated in terms of distance, are applied to each of the flanges. Because of the relative movement between elements 26 and 27, the relative angular displacement of the index marks is twice as great as when the marks are placed on the knob and housing. Furthermore, because of the relative movement between the elements, a vernier-type scale can be employed to permit accurate interpolation between the main distance index points thereby improving the accuracy of manually setting the subject distance into the device.

Since certain changes may be made in the above appa-

What is claimed is:

1. A photographic camera having a housing, shutter means and diaphragm means including at least two diaphragm elements movable relative to said housing, said elements having first cooperating contours which define the effective exposure aperture size;

manually operable actuator means for adjustably moving said diaphragm elements simultaneously in opposite directions;

indicating indicia calibrated in terms of subject distance functionally related to the correct exposure value of said shutter means when the subject is under flash illumination, said indicia comprising first index means on one of said diaphragm elements cooperating with second index means on another of said diaphragm elements and observable by a user when manipulating said actuator means;

second cooperating contours on said diaphragm blades that define a photometer aperture; and photometer means provided on said camera, said photometer means being responsive to the amount of light passing through said photometer aperture for indicating to the user when manual operation of said actuator means has adjusted the diaphragm elements to provide the exposure aperture that is correct for the average intensity of the scene being photographed under steady lighting conditions whereby under steady lighting conditions the user would operate said actuator means until said photometer means indicate that the exposure aperture is correct for such conditions and under flash illumination conditions the user would operate said actuator means until said index means indicate the distance of the subject to the camera.

2. Apparatus in accordance with claim 1 wherein said diaphragm elements are pivotally connected to said housing at a common point and each is provided with overlying but spaced extensions having cam follower elements on the extremity thereof, and wherein said actuator means includes a cam mounted for rotation on said housing in operable engagement with said cam follower elements on said extensions and arranged so that manual rotation of said cam causes opposite pivotal movement of said diaphragm elements.

3. A photographic camera having a housing, shutter means and diaphragm means including at least two diaphragm elements movable relative to said housing, said elements having cooperating contours which define the effective exposure aperture size;

manually operable actuator means for adjustably moving said diaphragm elements simultaneously in opposite directions, said diaphragm elements being pivotally connected to said housing at a common point;

indicating indicia calibrated in terms of subject distance functionally related to the correct exposure value of said shutter means when the subject is under flash illumination, said indicia comprising first index means on one of said diaphragm elements cooperating with second index means on another of said diaphragm elements and observable by a user when manipulating said actuator means.

References Cited

UNITED STATES PATENTS

| 2,013,362 | 9/1935 | Riszdorfer | 95—10 X |
| 2,018,384 | 10/1935 | Schoof | 88—1 X |
| 3,121,379 | 2/1964 | Macomber et al. | 95—11.5 X |

FOREIGN PATENTS

| 1,241,688 | 8/1960 | France. |
| 888,950 | 2/1962 | Great Britain. |

OTHER REFERENCES

MAAS, German application 1,173,793, printed July 9, 1964 (KL GO3b), 3 pp. spec., 1 sht. dwg. 95–10.

NORTON ANSHER, *Primary Examiner.*

JOSEPH F. PETERS, Jr., *Assistant Examiner.*

U.S. Cl. X.R.

95—64